United States Patent [19]

Shiozawa

[11] 4,456,361
[45] Jun. 26, 1984

[54] PROGRAM TYPE EXPOSURE CONTROLLING DEVICE

[75] Inventor: Kazuo Shiozawa, Tokyo, Japan

[73] Assignee: Konishiroku Photo Industry Co., Ltd., Tokyo, Japan

[21] Appl. No.: 550,052

[22] Filed: Nov. 7, 1983

Related U.S. Application Data

[63] Continuation of Ser. No. 365,587, Apr. 5, 1982, which is a continuation of Ser. No. 177,810, Aug. 13, 1980, abandoned.

[30] Foreign Application Priority Data

Aug. 18, 1979 [JP] Japan ............................... 54-104533
Dec. 18, 1979 [JP] Japan ............................... 54-163539

[51] Int. Cl.³ .................... G03B 7/08; G03B 7/087; G03B 7/097
[52] U.S. Cl. .................................................... 354/443
[58] Field of Search ....................................... 354/443

[56] References Cited

U.S. PATENT DOCUMENTS

| | | | |
|---|---|---|---|
| 4,054,887 | 10/1977 | Holle et al. | 354/43 |
| 4,174,160 | 11/1979 | Namba et al. | 354/38 |
| 4,210,393 | 7/1980 | Ishiguro et al. | 354/43 |
| 4,245,900 | 1/1981 | Nakamoto et al. | 354/23 D |

Primary Examiner—Russell E. Adams
Attorney, Agent, or Firm—James E. Nilles

[57] ABSTRACT

A program type exposure controlling device comprising, a circuit for generating an object brightness information, an aperture setting circuit for setting a preset stepwise aperture in accordance with the object brightness information, and a shutter speed determining circuit for determining a shutter speed in accordance with the object brightness information and the aperture information from the aperture setting circuit. The circuit for generating the object brightness information generates either an object brightness information or an object brightness information, which is prepared by correcting the former information in accordance with another exposure information. The program type exposure controlling device comprises a decoder circuit DEC for determining a shutter speed and an aperture value by decoding the digital brightness information. The decoder circuit DEC comprises a shutter speed determining circuit for determining a shutter speed in accordance with the digital brightness information and an aperture determining circuit for determining an aperture value in accordance with the digital brightness information, the shutter speed determining circuit and the aperture determining circuit being operated independently with each other. The decoder circuit further comprises a circuit for generating a rank information in accordance with the digital brightness information, and aperture determining circuit for determining a preset stepwise aperture corresponding to the rank. The program type exposure controlling device comprises an aperture setting mechanism which comprises:

(a) a movable aperture setting bar, which is urged by urging means such as a spring,
(b) at least one movable lever which can engage with an engaging portion mounted on the aperture setting bar,
(c) control device for controlling the engagement of the movable lever with the aperture setting bar, and
(d) charge lever to retain the aperture setting bar at an aperture charge position.

12 Claims, 7 Drawing Figures

PROGRAM TYPE EXPOSURE CONTROLLING DEVICE

REFERENCE TO RELATED CO-PENDING APPLICATION

This application is a continuation of application Ser. No. 365,587, filed Apr. 5, 1982, which in turn was a continuation of application Ser. No. 177,810 filed Aug. 13, 1980, now abandoned.

BACKGROUND OF THE INVENTION

1. Field of the Invention

The present invention relates to improvements in an exposure controlling device for a camera.

2. Description of the Prior Art

In a known electric shutter according to the prior art, the time constant of a shutter circuit is determined by designating an aperture in advance so that the shutter speed is set in accordance with said time constant and object brightness information. In a known program electric shutter requiring no designation of the aperture, the shutter also acts as the aperture so that the shutter blades are closed again before they are fully opened in case the object brightness is sufficient. The former shutter is troublesome because the aperture has to be designated in advance, and the latter shutter is restricted to the lens shutter.

In a known program type electric shutter which is not restricted to the lens shutter, on the other hand, the aperture and shutter speed, which are programmed in advance, are determined in accordance with the object brightness, or the aperture is set in accordance with the object brightness so that the shutter time second may be determined in accordance with the aperture and object brightness determined. In the former shutter, the aperture and shutter speed are determined in parallel in accordance with the program. However, it is difficult to actually set the aperture and shutter speed accurately at the programmed values. There arises a problem, in which the device not only becomes complex but also requires much time period for its setting. In the latter shutter, on the other hand, the aperture is first determined so that the shutter speed is determined in accordance with the aperture and object brightness determined. As a result, the setting of the aperture does not require such accuracy as the former shutter thereby to make it possible to raise the aperture setting rate. Since, however, the shutter speed is determined after the aperture setting is performed by the mechanical operations which require more time period than the electrical information processing, the latter shutter encounters the problems that the setting of the exposure conditions as a whole also requires considerable time period and that an aperture setting device for setting the aperture in accordance with the object brightness becomes considerably complex.

SUMMARY OF THE INVENTION

It is therefore an object of the present invention to eliminate the aforementioned problems concomitant with the program type electric shutter which is not restricted to a lens shutter and to provide a program type exposure controlling device which can be prepared merely by partially improving a conventional electric shutter circuit.

Another object of the present invention is to provide a program type exposure controlling device comprising: an object brightness information circuit; an aperture setting circuit for setting a preset stepwise aperture in accordance with the object brightness information which consists of a circuit for generating the rank information which is ranked in accordance with said object brightness information and an aperture determining circuit for determining a preset stepwise aperture corresponding to the ranks in accordance with said rank information; and a shutter speed determining circuit for determining a shutter time second in accordance with said object brightness information and said rank information.

According to the program type electric shutter of the present invention, more specifically, in order to determine a preset stepwise aperture in accordance with the rank information which is prepared by ranking object brightness information, the construction of the aperture setting device for actually determining the aperture can be made simple and rigid and can be operated promptly without fail. Since the aperture level set is stepwise constant and since the shutter speed is determined in accordance with the rank information and the object brightness information, the aperture and the shutter speed can be determined in parallel without awaiting the actual aperture determination. Thus, the present invention can enjoy an excellent advantage that the setting of the exposure conditions is performed within a short time period so that the shutter chance may not be missed.

Still another object of the present invention is to provide a program type exposure controlling device comprising: a brightness information circuit for generating either an object brightness information or an object brightness information, which is prepared by correcting the former information in accordance with another exposure information, as digital brightness information; and a decoder circuit for determining an aperture value and a shutter speed by decoding the digital brightness information.

Yet another object of the present invention is to provide a program type exposure controlling device comprising: an object brightness information circuit for generating either an object brightness information or an object brightness information, which is prepared by correcting the former information in accordance with another exposure information, as digital brightness information; and a decoder circuit which comprises a circuit for generating a rank information in accordance with the digital brightness information, an aperture determining circuit for determining a preset stepwise aperture corresponding to the rank, and a shutter speed determining circuit for determining a shutter speed, which is based on the digital brightness information in accordance with the ranks.

According to the present invention, more specifically, the object brightness information is ranked as digital brightness information by the decoder circuit to determine the stepwise aperture and the shutter speed at the same time. As a result, the whole structure of the exposure control circuit is simplified more to facilitate the large scale integration than the shutter device, in which the analog information of the object brightness is ranked to determine the aperture and the shutter speed. The fear of inviting the erroneous operations due to the hysterisis which is intrinsic to an analog comparator necessary for ranking the analog information is eliminated. As a result, the accuracy in determining the exposure conditions can be improved.

DETAILED DESCRIPTION OF THE PREFERRED EMBODIMENT

Figure 1:
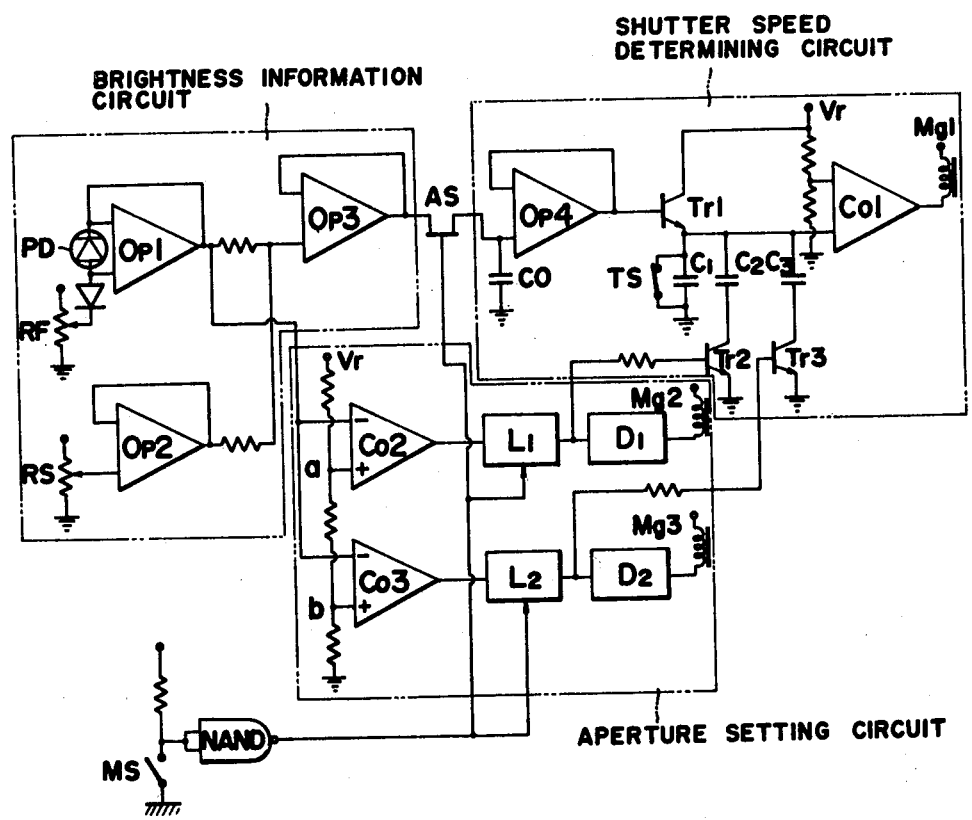
FIG. 1 is a circuit diagram showing one embodiment of a program type electric shutter according to the present invention.

In FIG. 1, a light emanating from an object enters a photodiode PD so that this photodiode PD generates a photocurrent according to the object brightness. This photocurrent is converted by a variable resistor RF for a wide-open F-number into an object brightness voltage corresponding to the wide-open F-number of the lens. The object brightness voltage is logarithmically amplified by an operational amplifier Op1 and is fed as the object brightness information out of the operational amplifier Op1.

This object brightness information from the operational amplifier Op1 is processed by an operational amplifier Op3 together with a film sensitivity information, which is set by a variable resistor RS for film sensitivity and amplified by an operational amplifier Op2, so that they are fed out of the operational amplifier Op3 as the object brightness information which corresponds to the wide-open F-number of the lens and to the film sensitivity. Moreover, the object brightness information is retained through an analog switch AS in a memory condenser C0, and the retained voltage is impressed through an operational amplifier Op4 upon the base of a transistor Tr1 for logarithmic elongation. Then, the collector current of the transistor Tr1 becomes a current which is equal to the logarithmically elongated value of the condenser C0. When a trigger switch TS is opened in synchronism with the opening operation of the shutter, a condenser C1 for setting the shutter speed is charged. When the charged voltage reaches a preset value, a comparator Co1 energizes an electromagnet Mg1 thereby to give the shutter speed.

The construction and operation as described above are similar to those of the electric shutter of a conventional single lens reflex camera if the photodiode PD is so constructed as to accomplish the photometry of the object brightness through the TTL open photometry.

According to the present invention, moreover, the object brightness information from the amplifier Op1 is fed, as shown, to two comparators Co2 and Co3 so that the object brightness is ranked into three steps of high, middle and low brightnesses whereby the aperture is automatically set at the three steps of minimum, middle and wide-open apertures in accordance with the ranks. In accordance with the apertures thus set, the shutter speed is properly accomplished in accordance with the object brightness information.

More specifically, the ranking is accomplished at the high brightness when the object brightness information fed to the negative terminals (−) of the comparators Co2 and Co3 is higher than both of comparison voltages a and b (a>b) fed to the positive terminals (+) of the same. On the other hand, when the object brightness information assume a value between the voltage a and b, the ranking is accomplished at the middle brightness. Moreover, when the object brightness assumes a value smaller than the voltages a and b, the ranking is accomplished at the low brightness. In accordance with these rankings, the comparators Co2 and Co3 generate signals, as tabulated in the following Table:

| Object Brightness | High | Middle | Low |
|---|---|---|---|
| Output of Co2 | 0 | 1 | 1 |
| Output of Co3 | 0 | 0 | 1 |

The output signals of those comparators Co2 and Co3 are fed through latch circuits L1 and L2, respectively, to driver circuits D1 and D2 and to the bases of transistors Tr2 and Tr3. For the output signal at 0, the driver circuits are not energized, and the transistors are rendered inconductive. For the output signal at 1, on the contrary, the driver circuits are energized so that electromagnets Mg2 and Mg3 for setting the aperture are also energized. At the same time, the transistors Tr2 and Tr3 are rendered conductive. As a result, under the condition having the object brightness ranked at a high level, the electromagnets Mg2 and Mg3 are left under their inoperative conditions so that the aperture assumes its minimum. The transistors Tr2 and Tr3 are also left under their inconductive conditions so that only the condenser C1 takes part in determining the shutter speed, as has been described in the above. Under the condition having the object brightness ranked at a middle level, on the contrary, the electromagnetic Mg2 is brought into its operative condition so that the aperture assumes its middle level. At the same time, the transistor Tr2 is rendered conductive so that an additional condenser C2 is brought into the condition under which it is connected in parallel with the condenser C1. Thus, the summed capacities of the condensers C1 and C2 take part in determining the shutter speed. Under the condition having the object brightness ranked at a low level, moreover, both the electromagnets Mg2 and Mg3 are under their operative conditions so that the aperture assumes its wide-open level. At the same time, the transistors Tr2 and Tr3 are rendered conductive so that additional condensers C2 and C3 are brought into the condition under which they are connected in parallel with the condenser C1. As a result, the summed capacities of the condensers C1, C2 and C3 take part in determining the shutter speed.

Figure 2:
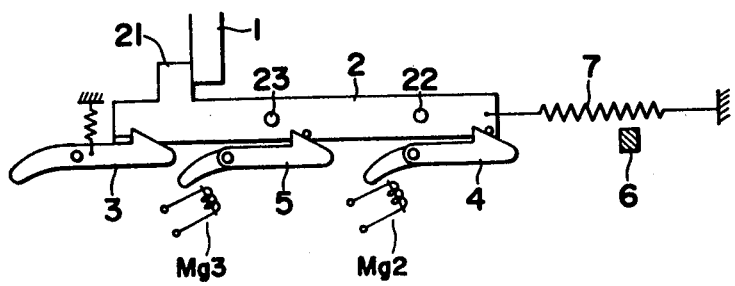
FIG. 2 is a diagrammatical side elevation showing an aperture setting mechanism.

Here, the relationship between the operations of the electromagnets Mg2 and Mg3 and the aperture is given by the mechanism, as shown in FIG. 2. In this Figure: reference numeral 1 indicates an aperture blade drive lever which is mounted on an interchangeable lens mount; numeral 2 an aperture setting bar mounted on the camera body; numeral 3 a charge position retaining lever of the aperture setting bar 2; numerals 4 and 5 intermediate aperture position lever and wide-open position lever, respectively; and numeral 6 a minimum aperture position retaining member. The aperture blade drive lever 1 is so biased by a spring (not shown) that it always abuts against the actuating arm 21 of the aperture setting bar 2 under the condition having the interchangeable lens mount mounted in the camera body. The aperture setting bar 2 is made to carry an intermediate aperture pin 22 and a wide-open aperture pin 23. For the camera having an uninterchangeable lens, incidentally, the aperture blade drive lever 1 and the aperture setting lever 2 may be made integral. The aperture setting lever 2, which is retained at the charge position in accordance with the film winding operations or the like, is released from its retained condition, when the charge position retaining lever 3 is turned clockwise in accordance with the releasing operation, so that it is pulled rightwardly by the tension of a spring 7. In this meanwhile, as has been described before, if both the electromagnets Mg2 and Mg3 are left under their inoperative conditions, the aperture setting lever 2 abuts against the minimum aperture position retaining member 6 to stop so that the aperture blades is made to take its minimum level through the aperture drive lever 1. If only the electromagnet Mg2 is under its operative condition, the intermediate aperture position lever 4 engages with the intermediate aperture pin 22 to stop the aperture setting lever 2 so that aperture is made to assumes its middle level. If both the electromagnets Mg2 and Mg3 are under their operative conditions, the wide-open aperture position lever 5 first engages with the wide-open aperture pin 23 to stop the aperture setting lever 2 so that the aperture is made to assume its wide-open level.

As has been described in the above, the aperture setting information by the comparators Co2 and Co3 is fed through the latch circuits L1 and L2 to the driver circuits D1 and D2 and to the transistors Tr2 and Tr3. This is because, since the object brightness information is varied in response to the releasing operation in case the photodiode PD is of the same TTL photometry type as that of the conventional single lens reflex camera, the aperture and the shutter speed are set in accordance with the object brightness information at the previous wide-open photometry. More specifically, when a wide-open switch MS is turned on in response to the releasing operation, the set signal is fed through a NAND circuit NAND to the latch circuits L1 and L2 so that these latch circuits L1 and L2 retain and feed out the aperture setting information at that time, thus receiving no influence due to the subsequent iris-out. Since, moreover, the output of the NAND is simultaneously fed to the analog switch AS thereby to turn off the same switch AS, the retained voltage of the memory condenser C0 holds the voltage level at that time, and the collector current of the transistor Tr1 has relationship with the retained voltage but receives no influence from the subsequent iris-out. As a result, in accordance with the object brightness information in the wide-open photometry, the aperture and the shutter speed are set so that the photography can be accomplished without any difficulty under the stable and proper exposure conditions.

In the present invention, the fact that the ranking of the object brightness information, i.e., the setting of the aperture in accordance with the object brightness information is so accomplished as to make the shutter speed higher than a preset speed in case the iris-out is to be effected has a meaning in preventing the shaking accident as much as possible during the photography. For this purpose, the object brightness information is indicated at letter f, and the object brightness information . $f_0$ for imparting the aforementioned preset shutter speed in the case of the minimum aperture is used as a standard. It is then sufficient to set the comparison voltages a and b of the comparators Co2 and Co3 in such a manner as to rank the relationship of $f > f_0$ at a high brightness, to rank the relationship of $f < (C1+C2)f_0/(C1+C2+C3)$ at a low brightness in the example of FIG. 1, and to rank the intermediate value at a middle brightness. Then, as is different from the case in which the photography is performed with the wide-open aperture, the photography is always performed with the shutter speed higher than a preset speed in case the middle or minimum aperture is taken, thus reducing the shaking accident.

Figure 3:
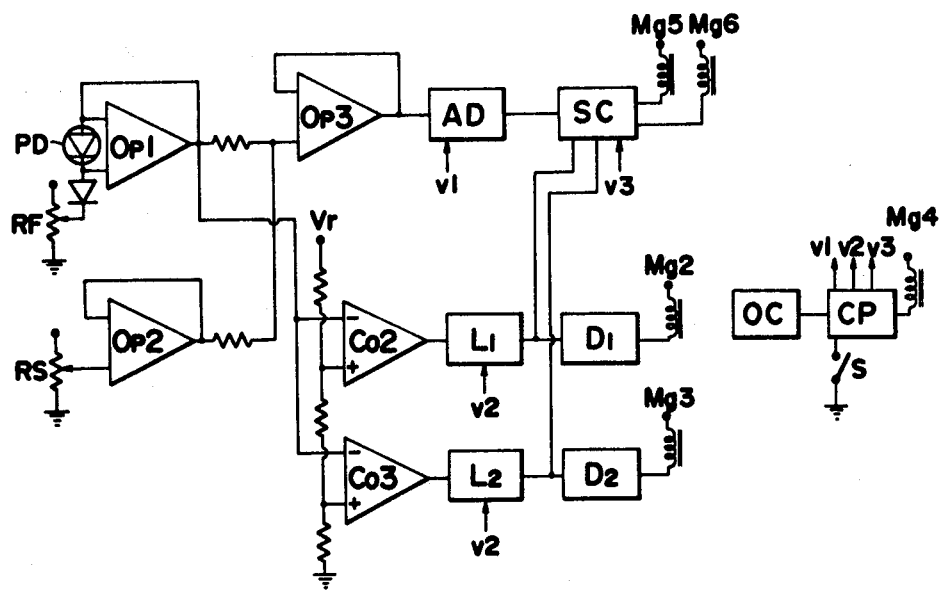
FIG. 3 is a circuit diagram showing another embodiment of the present invention.

The present invention should not be limited to the aforementioned embodiment but can be modified such that the comparison voltage of the comparator Co1 may be varied in place of the capacitance of the condenser in accordance with the variation in the aperture. In this modification, the shutter speed can be preset to fall within a preset range in a similar manner to the case in which the capacitance of the condenser is to be varied. On the other hand, FIG. 3 shows another embodiment, in which the circuit for setting the shutter time second in FIG. 1 is modified into a digital type. However, the object brightness information generating circuit and the aperture setting circuit are not different from those of FIG. 1 and are indicated by the same reference letters.

Figure 4:
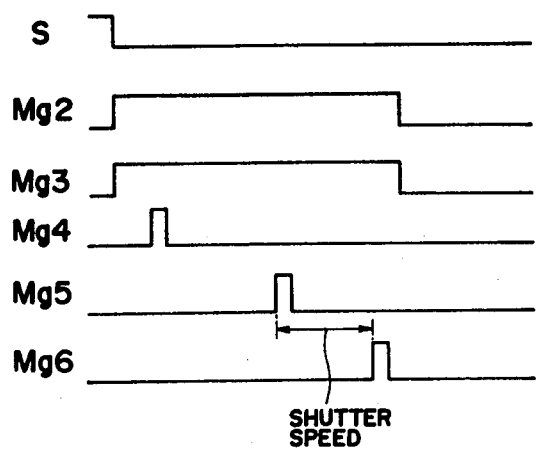
FIG. 4 is an operation time chart of FIG. 3.

Referring to FIG. 3, when a release switch S is turned on in response to the releasing operation, a control circuit CP accompanied by an oscillating and frequency-dividing circuit OC generates both a conversion stopping signal v1 with the timing, at which the AD conversion of an analog-digital converter AD is ended, and a set signal v2 for the latch circuits L1 and L2 with a similar timing. Then, the control circuit CP energizes a releasing electromagnet Mg4, which effects both the retention and release of the aperture charge position retaining lever 3 of FIG. 2 and the pop-up of the mirror of the single lens reflex camera, thereby to feed a shutter run starting signal v3 to a shutter control circuit SC. As a result, the object brightness information at the time when the conversion stop signal v1 is fed to the analog-digital converter AD is subjected to the AD conversion and fed to the shutter control circuit SC so that this control circuit SC receives the shutter run starting signal v3 under the condition in which the aperture setting information at the time when the set signal v2 is fed to the latch circuits L1 and L2 is fed to the shutter control circuit SC. In response to the signal v3, the shutter control circuit SC energizes a front plane control electromagnet Mg5 thereby to run the front plane. After such a time elapses as is determined in accordance with the object brightness information and aperture setting information supplied, the shutter control circuit SC energizes a rear plane control electromagnet Mg6 thereby to run the rear plane. The determination of the shutter speed in accordance with both the object brightness information and the aperture setting information is performed either by varying the counter or register of the control circuit SC by the aperture varied steps or by resorting to the known method in which the standard clock is varied. FIG. 4 shows the relationships of the operation timings among the release switch S and other electromagnets.

According to the present invention, there can be attained the following excellent advantages. The aperture setting device can be so constructed as to be promptly operated while enjoying simplicity and rigidity. Moreover, the aperture and the shutter speed are determined in parallel so that the proper exposure conditions can be set promptly and accurately. Consequently, it can be avoided to miss the shutter chance.

Still moreover, the program type electric shutter as a whole can be so simply constructed as to partially improve the conventional electric shutter circuit.

Figure 5:
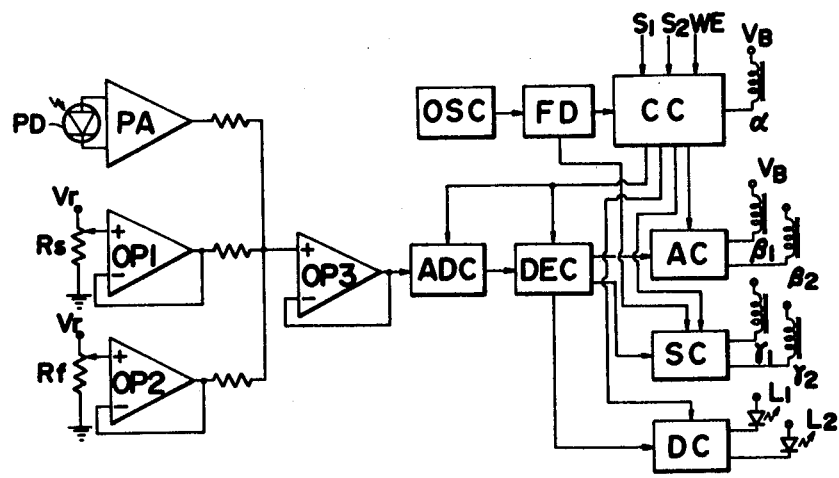
FIGS. 5 and 6 are block diagrams showing further embodiments of the present invention.

In FIG. 5: reference letters PA indicate a photometric circuit which is equipped with a photodiode PD for the TTL wide-open photometry; letters Rs a sliding resistor for setting the film sensitivity; letters Rf a variable resistor for setting wide-open F-number; and letters OP1 to OP3 operational amplifiers, respectively. All the object brightness information generated by the photometric circuit PA, the film sensitivity information generated by the operational amplifier OP1, and the wide-open F-number information generated by the operational amplifier OP2 are fed as analog information to the operational amplifier OP3 and are operated by the amplifier OP3 so that they are fed as the analog information of a light value LV for giving the corrected object brightness information to an analog-digital converting circuit ADC. This circuit ADC converts the light value LV received into digital brightness information, which is then fed to a decoder circuit DEC. This decoder circuit DEC includes a shutter speed determination circuit and aperture determining circuit and ranks the aforementioned digital brightness information thereby to feed the aperture signal to an aperture controlling circuit AC, the shutter speed signal to the shutter control circuit SC, and the display signal similar to the aperture signal to a display control circuit DC. Thus, the aperture controlling circuit AC controls the operations and inoperations of solenoids $\beta_1$ and $\beta_2$. On the other hand, the shutter control circuit SC controls the shutter speed from the time when a solenoid $\gamma_1$ for starting the front plane is operated to the time when a solenoid $\gamma_2$ for starting the rear plane is operated. On the other hand, the display control circuit DC determines the operations and inoperations of light emitting elements L1 and L2.

The following Table explains one example, in which the aperture and the shutter speed are determined in case the digital brightness information is obtained in six bits and in case the decoder circuit DEC effects the ranking to any of the three steps:

| Light Value LV | Digital Brightness Information | Rank | Aperture $\beta_1$ | $\beta_2$ | F-No. | Shutter Speed ms |
|---|---|---|---|---|---|---|
| 17 | 000000 | High | 0 | 0 | 11 | 0.98 |
| ∫ | ∫ | | | | | ∫ |
| 14 | 001100 | | | | | 7.81 |
| 13 | 001101 | Mid. | 0 | 1 | 5.6 | 2.44 |
| ∫ | ∫ | | | | | ∫ |
| 11 | 011000 | | | | | 15.60 |
| 10 | 011001 | Low | 1 | 0 | 2.8 | 4.88 |
| ∫ | ∫ | | | | | ∫ |
| 8 | 100100 | | | | | 31.30 |

In the above Table: the value 0 of the solenoids $\beta_1$ and $\beta_2$ implies inoperativeness; and the value of 1 of the same implies operativeness. In response to these operativeness and inoperativeness of those solenoids $\beta_1$ and $\beta_2$, a preset aperture corresponding to the rank is given by means of the aperture setting device shown in FIG. 2.

Reverting to FIG. 2, more specifically, when the charge position retaining lever 3 is turned clockwise in response to the releasing operation so that it is released from the retention by the aperture setting bar 2, this bar 2 is pulled rightward by the tension of the spring 7 so that the aperture blade drive lever 1, which has been urged into abutment contact with the actuating arm 21 of the aperture setting bar 2 by the action of the spring (not shown) by that time, is displaced to effect the iris-out. If, moreover, the digital brightness information is ranked at a high level so that both the solenoids $\beta_1$ and $\beta_2$ are inoperative at the levels 0 and 0, the aperture setting bar 2 is finally brought into abutment contact with the minimum aperture position retaining member 6 until it is stopped. As a result, the aperture setting bar 2 gives a preset accurate F-number 11 under its stop condition. If, on the other hand, the digital brightness information is ranked at a middle level, the solenoid $\beta_1$ is inoperative at the level 0 whereas the solenoid $\beta_2$ is operative at the level 1 so that the intermediate aperture retaining lever 4 is turned by the operation of the solenoid $\beta_2$ in the counter-clockwise direction in response to the rightward movement of the aperture setting bar 2 until it is brought into a position where it is in engagement with the intermediate aperture pin 22 of the aperture setting bar 2. As a result, the aperture setting bar 2 has its intermediate aperture pin 22 engaging with the intermediate aperture position lever 4 so that it is stopped. Under this stop position, a preset accurate F-number 5.6 is given. If, on the other hand, the digital brightness information is ranked at a low level, the solenoid $\beta_1$ becomes operative so that the aperture setting bar 2 has its wide-open aperture pin 23 retained on the wide-open position lever 5 so that it is stopped, thus giving a preset accurate F-number 2.8. In this instance, even if the solenoid $\beta_2$ is made operative at the level 1, the intermediate aperture pin 22 is avoided from engagement with the intermediate aperture position lever 4 so that no trouble results.

As has been described hereinbefore, if the ranking of the digital brightness information is accomplished by the decoder circuit DEC, the F-number is set at a preset accurate level in accordance with that rank. Therefore, the determination of the shutter speed in accordance with the F-number need not await the actual setting of the F-number, but the determination will lead directly to the determination of the shutter speed in accordance with that rank and the digital brightness information.

The timings, at which the foregoing respective operations are to be accomplished, will now be described in the following.

In FIG. 5: reference letters OSC indicate an oscillating circuit; and letters FD indicate a frequency dividing circuit for dividing the frequency of the signal of the oscillating circuit OSC to feed the age signal to a main control circuit CC and the shutter control circuit SC. If the releasing operation is performed, a photometric switch (not shown) is responsively operated to bring the photometric circuit PA into its operation. At the same time, the main control circuit CC is supplied with a signal S1 so that it is brought into its operation. Moreover, in response to the releasing operation, the release switch (not shown) is operated to feed a signal S2 to the main control circuit CC. In response to the signal S2, the main control circuit CC feeds starting signals to the analog-digital converting circuit ADC, the decoder circuit DEC and the shutter control circuit SC, respectively, so that these circuits are brought into their operative conditions. As has been described hereinbefore, the analog-digital converting circuit ADC digitally converts the light value LV, which is fed from the operational amplifier OP3, to feed the digital brightness information to the decoder circuit DEC. This decoder circuit DEC ranks the digital brightness information to feed the aperture signal, which controls the operations and inoperations of the solenoids $\beta_1$ and $\beta_2$ in accordance with the ranks, to the aperture controlling circuit AC, to feed the shutter speed signal, which corresponds to the rank in accordance with the digital brightness information, to the shutter control circuit SC, and to feed the display signal similar to the aperture signal to the disply control circuit.

After that, the main control circuit CC feeds the setting signals to the analog-digital converting circuit ADC and the decoder circuit DEC thereby to retain their respective output values and feeds the starting signal to the aperture controlling circuit AC at the same time thereby to render the solenoids $\beta_1$ and $\beta_2$ operative and inoperative in accordance with the aperture signal of the decoder circuit DEC. Consequently, the main control circuit CC operates a solenoid $\alpha$, which controls the pop-up of the mirror and the retention and release of the charge position retaining lever 3 of FIG. 2, thereby to start the mirror pop-up and the aforementioned rightward movement of the aperture setting bar 2 and feeds the signal to the shutter control circuit SC with the timing, at which the mirror pop-up and the aperture setting are finished, so that a solenoid $\gamma_1$ for starting the front plane may operate the shutter control circuit SC thereby to run the front plane. Then, the shutter control circuit SC partly operates the solenoid $\gamma_1$ and partly starts the counting operation of the age signal from the frequency dividing circuit FD. When the counted signal becomes coincident with the shutter speed from the decoder circuit DEC, the shutter control circuit SC operates a solenoid $\gamma_2$ for starting the rear plane thereby to run the rear plane. As a result, it is possible to obtain the shutter speed which corresponds to the ranks based upon the digital brightness information, as has been tabulated in the foregoing Table. In other words, the shutter control circuit SC is constructed to include a counter circuit and a digital comparator circuit. Incidentally, the display control circuit DC is brought into its operative condition in response to the starting signal from the main control circuit CC at a suitable time from the instant when the main control circuit CC is brought into its operative condition to the instant when the shutter front plane starts its running operation. In response to the display signal from the decoder circuit DEC, the display control circuit CC drives the light emitting elements L1 and L2, when the digital brightness information is at its high level, only the element L1 at a middle level and only the element L2 at a low level. Thus, the display control circuit CC accomplishes the luminous displays of the ranks of the object brightness and the F-numbers with the use of the light emitting elements L1 and L2.

The setting of the exposure conditions and the photography are accomplished in accordance with the procedures as above described. When the film winding operations are accomplished by a winding mechanism (not shown) and when the mirror, the aperture device and the shutter are charged, the main control circuit CC is supplied with a wind end signal WE in response to the end of the winding operations. Then, the main control circuit CC feeds a restoring signal to the analog-digital converting circuit ADC and so on thereby to return the respective circuits to their original conditions so that all the circuits restore their initial conditions, thus completely finishing a series of the photographic procedures.

Figure 7:
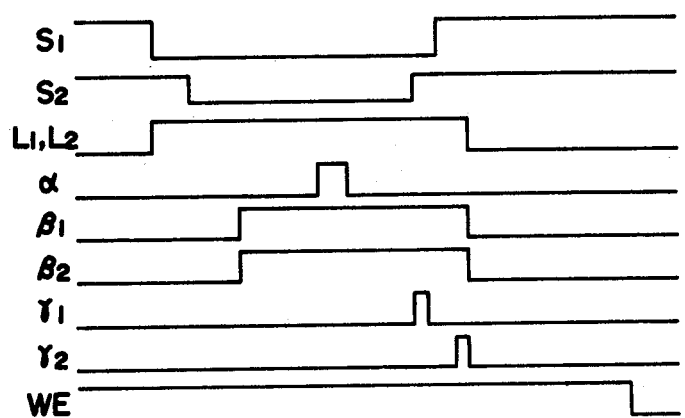
FIG. 7 is an operation time chart of FIGS. 5 and 6.

The timings of the operations as above described are shown in the chart of FIG. 7. In response to the age signal from the frequency dividing circuit FD, the main control circuit CC accomplishes the aforementioned timing controls. The construction, as is disclosed in FIG. 2 of Japanese patent application Laid-Open Publication No. 20,724/79, can be utilized in the main control circuit CC as above described.

Figure 6:
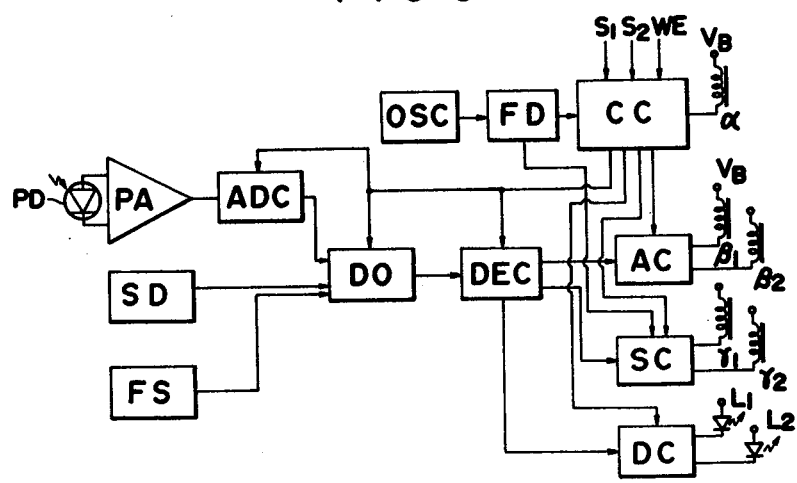

FIG. 6 shows another embodiment, in which only the object brightness is obtained as the analog information and in which the film sensitivity information and the wide-open F-number information of the lens are given as the digital information by a digital switch SD for setting the film sensitivity and a digital switch FS for setting the wide-open F-number, resectively. This embodiment is made different from that shown in FIG. 1 only in the points that the object brightness information of the photometric circuit PA is solely converted in a digital manner by the analog-digital converting circuit ADC and is fed to a digital operator DO together with the film sensitivity digital information and the wide-open F-number digital information, which are fed out of the film sensitivity setting digital switch SD and the wide-open F-number setting digital switch FS, respectively, so that the digital operator DO feeds the digital brightness information to the decoder circuit DEC and that the start signal, the setting signal and the restoring signal from the main control circuit CC are also fed to the aforementioned analog-digital converting circuit ADC and digital operator DO. However, the operations for setting the exposure conditions and for accomplishing the photography are performed in a similar manner to those of FIG. 1.

According to this embodiment as above described, there can be attained an excellent advantage that the setting operations of the exposure conditions are accomplished accurately and promptly without losing the shutter chance and that the exposure control circuit as a whole can be constructed so simply as to facilitate the large scale integration.

The present invention should not be limited to the embodiments as above described. For example, the camera itself should not be limited to the single lens reflex type. Even if the camera is of the single lens reflex type, the photometry may be effected after the mirror is popped up. Since, in this modification, the pop-up of the mirror has to be accomplished prior to the aperture setting operation, the solenoid for the mirror pop-up may be made separate from the solenoids for releasing the charge position retaining lever of the aperture setting device such that they can operate at suitable instants.

What is claimed is:

1. A program type exposure controlling device for apparatus having an aperture setting device which is adjustable in steps to any one of a plurality of preset aperture settings and having a shutter whose speed is adjustable comprising: an object brightness information circuit for receiving light from an object and for generating a first object brightness information signal related thereto; first means for receiving said first object brightness information signal and for providing a second aperture information signal for setting said aperture setting device at a selected one of said settings in accordance with said first object brightness information signal; and second means for receiving said first object brightness information signal and said second aperture information signal, for determining a shutter speed in accordance with both of said last-recited first and second signals, and for providing a third signal for operating said shutter at the determined shutter speed.

2. A program type exposure controlling device according to claim 1 wherein said object brightness information circuit generates a first object brightness information digital signal; and further including a decoder circuit for receiving said first object brightness information digital signal, for determining a shutter speed and an aperture value for decoding said first object brightness information digital signal, and for providing a second output signal for setting said aperture device at the determined aperture value and for providing a third output signal for operating said shutter at the determined shutter speed.

3. A program type exposure controlling device is set forth in claim 2, wherein said decoder circuit comprises a shutter speed determining circuit for determining a shutter speed in accordance with said first object brightness information digital signal and an aperture setting circuit for determining an aperture value in accordance with said first object brightness information digital signal, the shutter speed determining circuit and the aperture setting circuit being operated independently of each other.

4. A program type exposure controlling device as set forth in claim 2, wherein said decoder circuit comprises: a comparator circuit for generating a rank information signal in accordance with said first object brightness information digital signal, said rank information signal being ranked in accordance with the value of said first object brightness information signal and operative to determine one of said preset aperture settings, said first means, including an aperture setting circuit for receiving said rank information signal and for determining a preset aperture setting corresponding to the rank, and said second means including a shutter speed determining circuit for receiving said rank information signal and for determining a shutter speed which is based on the digital brightness information in accordance with the ranks.

5. A program type exposure controlling device as set forth in claim 1 or 2 or 3 or 4 wherein said aperture setting device includes an aperture setting mechanism which comprises:
(a) a movable aperture setting means, which is biased by biasing means such as a spring,
(b) at least one movable means which can engage with an engaging portion mounted on said movable aperture setting means,
(c) control means for controlling the engagement of said movable means with said movable aperture setting means, and
(d) charge means to retain said movable aperture setting means at an aperture charge position.

6. A program type exposure controlling device as set forth in claims 1 or 2, including means in said object brightness information circuit whereby said first object brightness information signal is corrected in accordance with other exposure information.

7. A program type exposure controlling device as set forth in claim 1 or 6 wherein said second aperture information signal to determine shutter speed is one of a plurality of signals indicative of the rank of brightness of the object brightness information signal.

8. A program type exposure controlling device according to claim 1 wherein said first means comprises an aperture setting circuit and said second means comprises a shutter speed determining circuit.

9. A program type exposure controlling device for apparatus having a preset stepwise aperture setting device and a shutter, said aperture setting device comprising: a movable aperture setting member, which is biased by biasing means such as a spring, a plurality of movable members engageable with engaging portions mounted on said movable aperture setting member, control means including solenoids for controlling the engagement of said movable members with said movable aperture setting member, and charge means to retain said movable aperture setting member at an aperture charge position; said shutter being operated by shutter solenoid means, said exposure controlling device comprising: an object brightness information circuit for receiving light from an object and for generating a first object brightness information signal related thereto; a comparator circuit for generating a rank information signal in accordance with said first object brightness information signal, said rank information signal being ranked in accordance with the value of said first object brightness information signal and operative to determine one of the preset aperture settings; an aperture setting circuit for receiving said rank information signal in accordance with said first object brightness information signal and for providing a second aperture information signal to operate said solenoids for determining said preset stepwise aperture setting in accordance with the rank of the object brightness information signal; and a shutter speed determining circuit for receiving said rank information signal in accordance with said first object brightness information signal and said second aperture information signal and for determining a shutter speed in accordance with said last-recited signals, and for providing a third signal for operating said shutter solenoid means to effect operation of said shutter at the determined shutter speed, said aperture setting circuit and said shutter speed determining circuit being operable independently of each other.

10. A program type exposure controlling device according to claim 9 wherein said object brightness information circuit generates a first object brightness information digital signal; and including a decoder circuit for receiving said first object brightness information digital signal, for determining a shutter speed and an aperture value by decoding said first object brightness information digital signal and for providing a second output signal to said aperture setting circuit and to said shutter speed determining circuit for setting said aperture device at the determined aperture value and for providing a third output signal for operating said shutter at the determined shutter speed.

11. A program type exposure controlling device as set forth in claim 9 or 10, including means in said object brightness information circuit whereby said first object brightness information signal is corrected in accordance with other exposure information.

12. A program type exposure controlling device for apparatus having an aperture setting device which is adjustable in steps to any one of a plurality of present aperture settings and having a shutter whose speed is adjustable comprising:
an object brightness information circuit for receiving light from an object and for generating an object brightness information signal related thereto;
means for receiving said object brightness information signal and for determining and providing an aperture information signal solely in accordance with said object brightness information signal;

means for receiving said aperture information signal and for determining and providing a shutter time information signal in accordance with said aperture information signal and in accordance with said object brightness information signal;

and means for operating said aperture setting device at one of said settings in accordance with said aperture information signal, and for operating said shutter at a shutter speed in accordance with the position of said aperture setting device in accordance with said shutter information signal.

* * * * *